(12) United States Patent
Flemming et al.

(10) Patent No.: US 9,581,208 B2
(45) Date of Patent: Feb. 28, 2017

(54) AUTOMATIC TRANSMISSION AND A DOG CLUTCH FOR AN AUTOMATIC TRANSMISSION

(71) Applicant: ZF Friedrichshafen AG, Friedrichshafen (DE)

(72) Inventors: Nico Flemming, Waterloo, SC (US); Odilo Raphael Nawratil, Simpsonville, SC (US); David Edward Drosback, Greenville, SC (US); Abhishek Baradwaj Raydurga Palegar, Simpsonville, SC (US); Thomas Geiss, Simpsonville, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 133 days.

(21) Appl. No.: 14/729,351

(22) Filed: Jun. 3, 2015

(65) Prior Publication Data

US 2016/0356320 A1 Dec. 8, 2016

(51) Int. Cl.
| | | |
|---|---|---|
| F16D 23/00 | (2006.01) | |
| F16D 23/04 | (2006.01) | |
| F16H 3/44 | (2006.01) | |
| F16D 11/16 | (2006.01) | |
| F16D 23/06 | (2006.01) | |

(52) U.S. Cl.
CPC .............. *F16D 23/04* (2013.01); *F16D 11/16* (2013.01); *F16H 3/44* (2013.01); *F16D 2023/0625* (2013.01); *F16D 2023/0656* (2013.01); *F16H 2200/2094* (2013.01)

(58) Field of Classification Search
CPC ..... F16D 23/02; F16D 23/025; F16D 2250/00
See application file for complete search history.

(56) References Cited

U.S. PATENT DOCUMENTS

| | | | | |
|---|---|---|---|---|
| 1,955,656 | A * | 4/1934 | Riley ..................... | F16H 3/06 74/333 |
| 2,400,536 | A * | 5/1946 | Chilton .................. | F16D 67/00 475/66 |
| 2,972,397 | A * | 2/1961 | Sinclair .................. | F16D 23/10 192/46 |
| 3,458,021 | A * | 7/1969 | Clements ............... | F16D 23/10 192/46 |
| 3,620,336 | A * | 11/1971 | Clements ............... | F16D 23/10 192/35 |
| 4,619,150 | A * | 10/1986 | Wiggenhauser ....... | F16D 11/14 29/893.1 |
| 5,083,993 | A * | 1/1992 | Oun ........................ | F16D 23/06 192/48.91 |

* cited by examiner

*Primary Examiner* — Tisha Lewis
(74) *Attorney, Agent, or Firm* — Dority & Manning, P.A.

(57) ABSTRACT

A dog clutch for an automatic transmission includes a mating clutch that defines a plurality of helical splines and a sliding clutch that defines a plurality of helical splines. The helical splines of the sliding clutch mesh with the helical splines of the mating clutch in an engaged configuration. The dog clutch also includes a synchronizer positioned at the sliding clutch. A related automatic transmission is also provided.

18 Claims, 5 Drawing Sheets

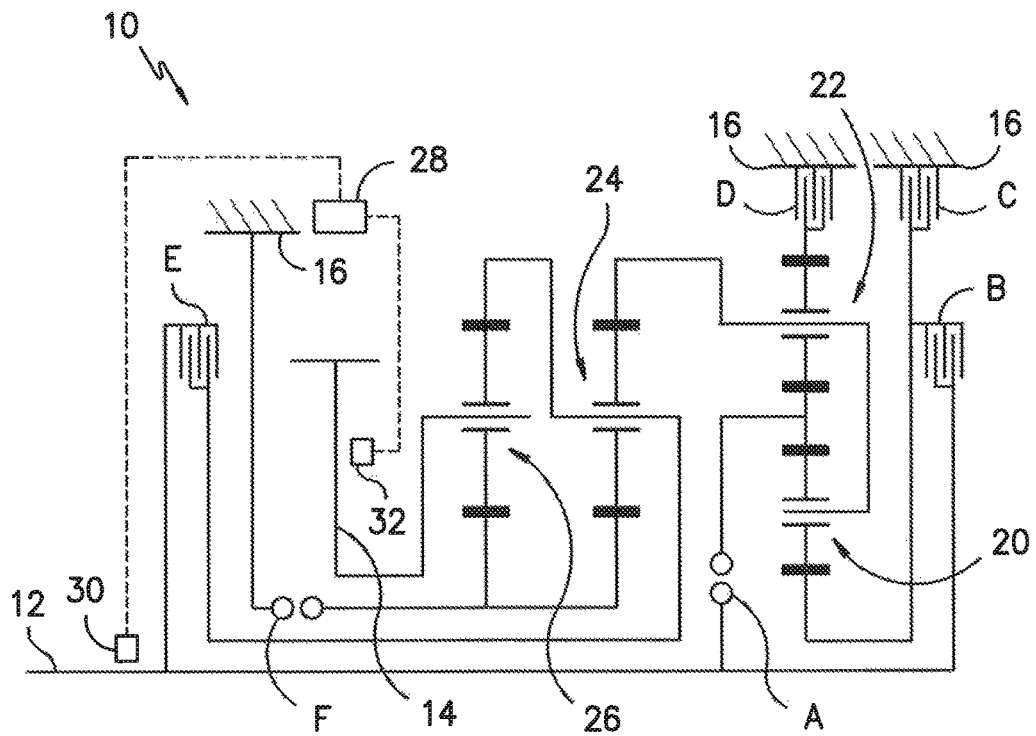
FIG. -1-
| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |
FIG. -2-

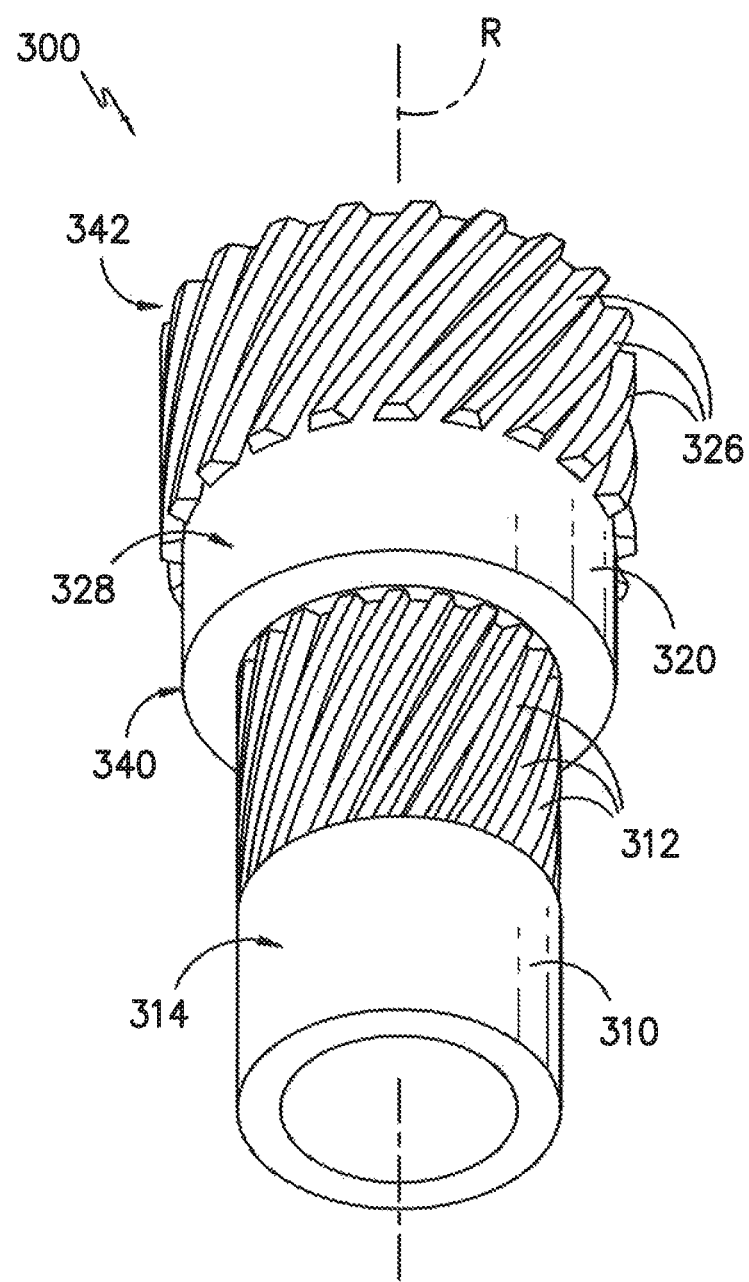
FIG. -3-

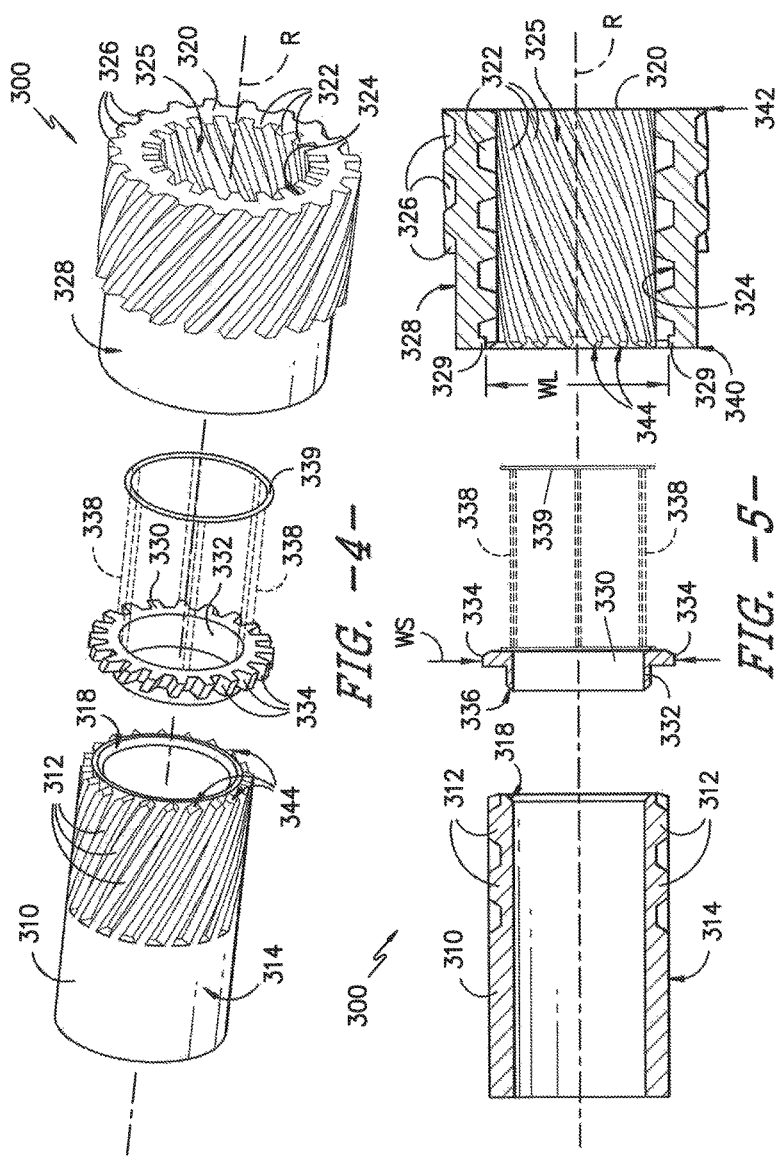

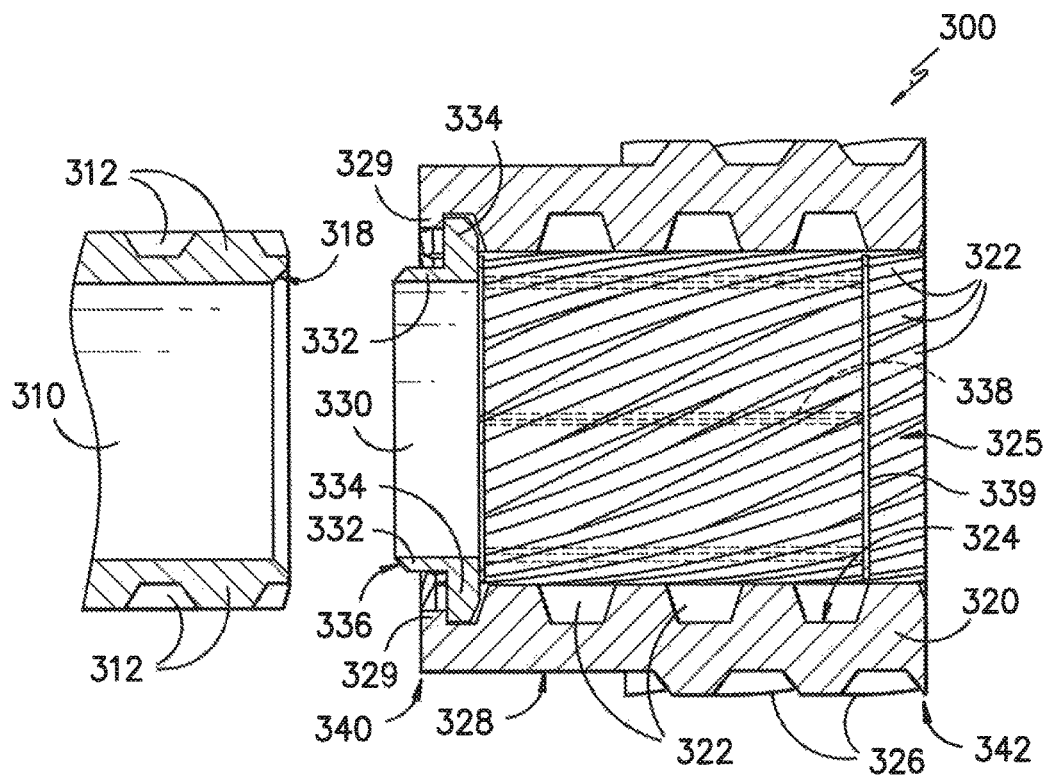
FIG. -6-
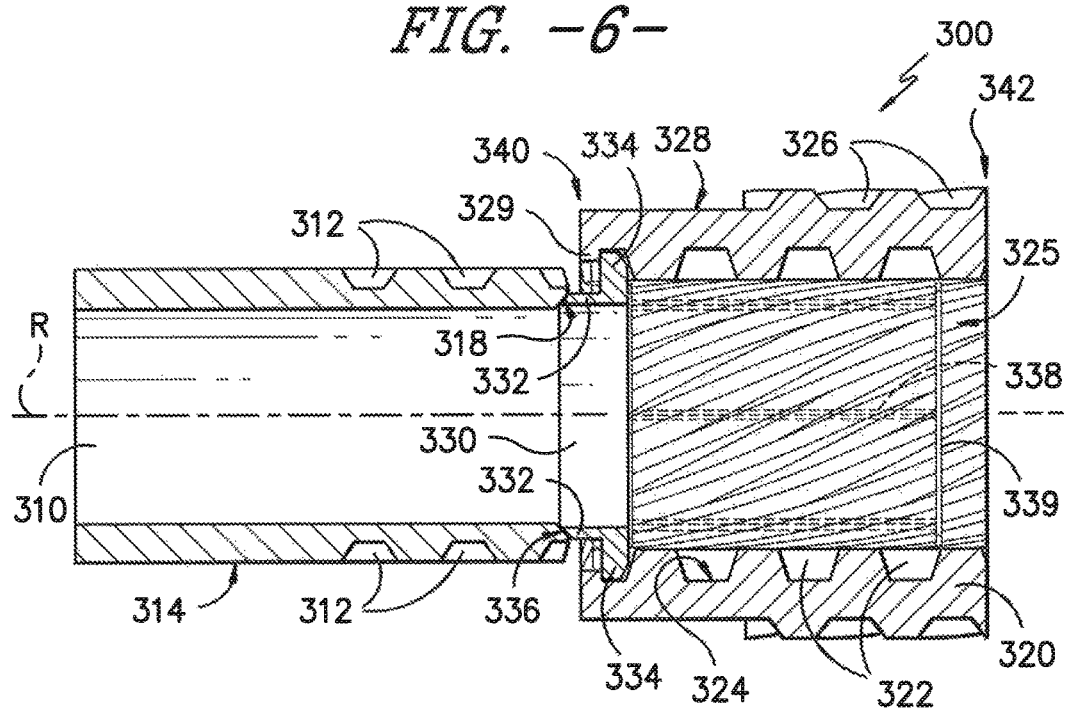
FIG. -7-

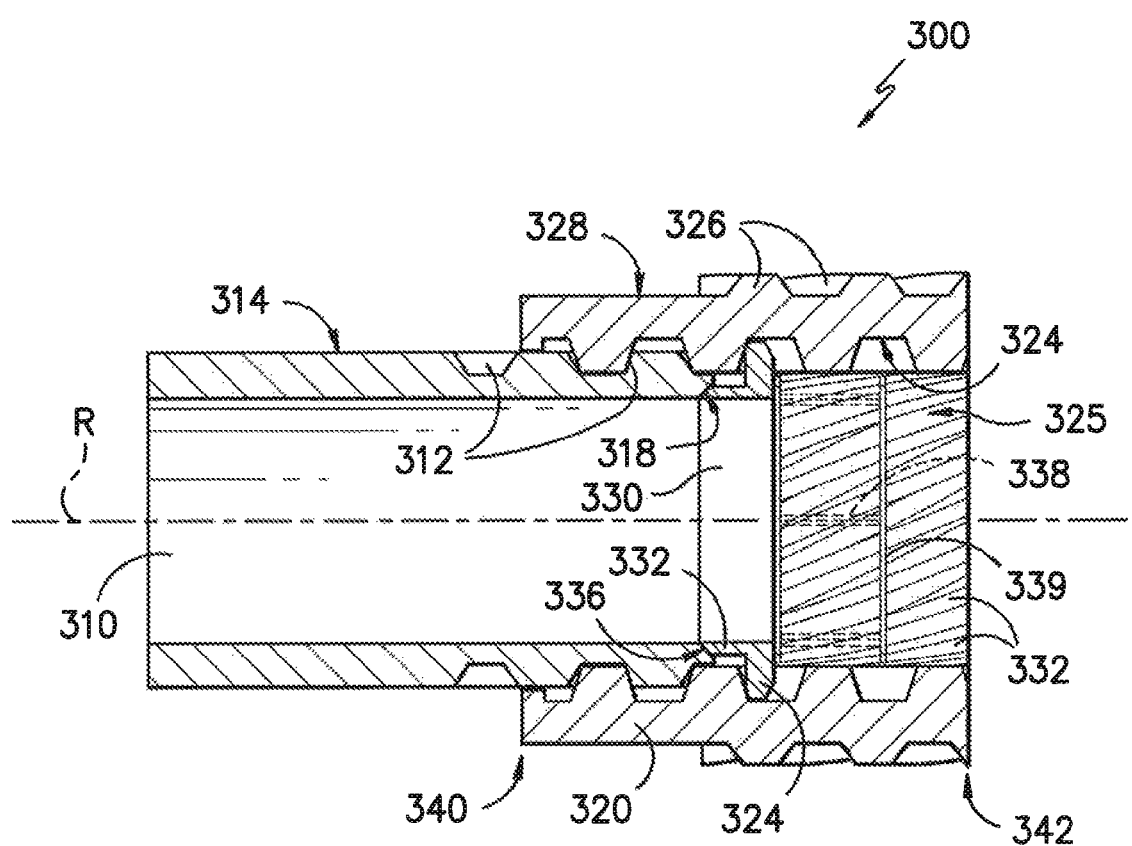
FIG. -8-

AUTOMATIC TRANSMISSION AND A DOG CLUTCH FOR AN AUTOMATIC TRANSMISSION

FIELD OF THE INVENTION

The present subject matter relates generally to automatic transmissions and shifting elements for automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include dog clutch shifting elements. During various gear shifts, the dog clutch is engaged or closed. Engaging the dog poses certain challenges. For example, dog clutch actuation can require precise timing and sensors to activate the dog clutch without noise or damage. However, precision timing can be difficult to achieve, and additional sensors can add to the cost of an associated automatic transmission.

Accordingly, an automatic transmission with features for assisting with actuating a shifting element of the automatic transmission would be useful. In particular, a dog clutch with features for assisting with actuating the dog clutch would be useful.

BRIEF DESCRIPTION OF THE INVENTION

The present subject matter provides a dog clutch for an automatic transmission. The dog clutch includes a mating clutch that defines a plurality of helical splines and a sliding clutch that defines a plurality of helical splines. The helical splines of the sliding clutch mesh with the helical splines of the mating clutch in an engaged configuration. The dog clutch also includes a synchronizer positioned at the sliding clutch. A related automatic transmission is also provided. Additional aspects and advantages of the invention will be set forth in part in the following description, or may be apparent from the description, or may be learned through practice of the invention.

In a first exemplary embodiment, an automatic transmission is provided. The automatic transmission includes a plurality of planetary gear sets and a plurality of shifting elements, including a dog clutch. The dog clutch includes a mating clutch mounted to a gear of the plurality of planetary gear sets. The mating clutch defines a plurality of helical splines at an outer surface of the mating clutch. A sliding clutch defines a plurality of helical splines at an inner surface of the sliding clutch. The sliding clutch is movable between an engaged configuration and a disengaged configuration. The helical splines of the plurality of helical splines of the sliding clutch mesh with the helical splines of the plurality of helical splines of the mating clutch in the engaged configuration. The helical splines of the plurality of helical splines of the sliding clutch are not mesh with the helical splines of the plurality of helical splines of the mating clutch in the disengaged configuration. A synchronizer is positioned at the sliding clutch. The synchronizer includes a base and a plurality of teeth extending from the base. Each tooth of the plurality of teeth is positioned between a pair of helical splines of the plurality of helical splines of the sliding clutch.

In a second exemplary embodiment, a dog clutch for an automatic transmission is provided. The dog clutch includes a mating clutch that defines a plurality of helical splines at an outer surface of the mating clutch. A sliding clutch defines a first plurality of helical splines at an inner surface of the sliding clutch and a second plurality of helical splines at an outer surface of the sliding clutch. The sliding clutch is movable between an engaged configuration and a disengaged configuration. The helical splines of the first plurality of helical splines of the sliding clutch mesh with the helical splines of the plurality of helical splines of the mating clutch in the engaged configuration. The helical splines of the first plurality of helical splines of the sliding clutch are not meshed with the helical splines of the plurality of helical splines of the mating clutch in the disengaged configuration. A synchronizer is positioned at the sliding clutch. The synchronizer includes a base and a plurality of teeth extending from the base. Each tooth of the plurality of teeth is positioned between a pair of helical splines of the first plurality of helical splines of the sliding clutch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including le best mode thereof, directed to one of ordinary skill in the art, is set forth in the specification, which makes reference to the appended figures.

FIG. 1 provides a schematic view of an automatic transmission according to an exemplary embodiment of the present subject matter.

FIG. 2 illustrates a table of an exemplary shifting scheme as may be used with the exemplary automatic transmission of FIG. 1.

FIG. 3 provides a perspective view of a dog clutch according to an exemplary embodiment of the present subject matter.

FIG. 4 provides an exploded view of the exemplary dog clutch of FIG. 3.

FIG. 5 provides an exploded, section view of the exemplary dog clutch of FIG. 3.

FIGS. 6, 7 and 8 provide section views of the exemplary dog clutch of FIG. 3 with the dog clutch shown various positions.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch 13, a multidisc brake C, multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

FIG. 3 provides a perspective view of a dog clutch 300 according to an exemplary embodiment of the present subject matter. FIG. 4 provides an exploded view of dog clutch 300. FIG. 5 provides an exploded, section view of dog clutch 300. Dog clutch 300 may be used in any suitable automatic transmission. For example, dog clutch 300 may be used in automatic transmission 10 as dog clutch A and/or dog clutch F (FIG. 1). Thus, while described in greater detail below in the context of automatic transmission 10, it will be understood that dog clutch 300 may be used in or with any other suitable transmission, such as a six-speed automatic transmission, an eight-speed automatic transmission, a ten-speed automatic transmission, etc., in alternative exemplary embodiments. As discussed in greater detail below, dog clutch 300 includes features for assisting with shifting dog clutch 300 between an engaged configuration and a disengaged configuration.

As may be seen in FIGS. 3-5, dog clutch 300 includes a mating gear or clutch 310 and a sliding clutch 320. Mating clutch 310 may be mounted or fixed to any suitable component of automatic transmission 10, e.g., such that mating clutch 310 does not rotate relative to such component. For example, mating clutch 310 may be mounted or fixed to input shaft 12 when used as dog clutch A or to transmission housing 16 when used as dog clutch F. Sliding clutch 320 may also be mounted to any suitable component of automatic transmission 10, e.g., such that sliding clutch 320 does not rotate relative to such component. For example, sliding clutch 320 may be mounted to the sun gear of second planetary gear set 22 and the ring gear of first planetary gear set 20 when used as dog clutch A or to the sun gear of third and fourth planetary gear sets 24, 26 when used as dog clutch F.

As discussed above, dog clutch 300 is adjustable between an engaged configuration and a disengaged configuration. In the engaged configuration, sliding clutch 320 engages mating clutch 310, e.g., such that mating clutch 310 and sliding clutch 320 rotate at a common angular velocity about an axis of rotation R of dog clutch 300. Conversely, in the disengaged configuration, sliding clutch 320 does not engage mating clutch 310, e.g., such that mating clutch 310 and sliding clutch 320 may rotate relative to each other about the axis of rotation R. As discussed in greater detail below, sliding clutch 320 is configured for moving axially, e.g., along the axis of rotation R, in order to shift dog clutch 300 between the engaged and disengaged configurations.

Mating clutch 310 defines a plurality of helical projections or splines 312. Splines 312 of mating clutch 310 may be positioned on or at an outer surface 314 of mating clutch 310. Splines 312 of mating clutch 310 may be milled, broached or otherwise suitably formed on outer surface 314 of mating clutch 310. Splines 312 of mating clutch 310 may also extend helically along the outer surface 314 of mating clutch 310 and also radially outward from outer surface 314 of mating clutch 310, as shown in FIG. 3. Splines 312 of mating clutch 310 may be wound such that splines 312 of mating clutch 310 form right-handed or left-handed helixes on outer surface 314 of mating clutch 310. In particular, splines 312 of mating clutch 310 may be wound in the direction that mating clutch 310 rotates about the axis of rotation R during engagement of sliding clutch 320 with mating clutch 310 as dog clutch 300 shifts from the disengaged configuration to the engaged configuration. Mating clutch 310 may also have a generally cylindrical shape.

Like mating clutch 310, sliding clutch 320 also defines helical projections or splines. In particular, sliding clutch 320 includes or defines a first plurality of helical splines 322 and a second plurality of helical splines 326. First splines 322 of sliding clutch 320 may be positioned on or at an inner surface 324 of sliding clutch 320. First splines 322 of sliding clutch 320 may be milled, shaped, extruded or otherwise suitably formed on inner surface 324 of sliding clutch 320. First splines 322 of sliding clutch 320 may also extend helically along the inner surface 324 of sliding clutch 320 and also radially inward from inner surface 324 of sliding clutch 320, as shown in FIG. 4. First splines 322 of sliding clutch 320 may be wound such that first splines 322 of sliding clutch 320 form right-handed left-handed helixes on inner surface 324 of sliding clutch 320. In particular, first splines 322 of sliding clutch 320 may be wound in the direction that sliding clutch 320 rotates about axis of rotation R during engagement of sliding clutch 320 with mating clutch 310 as dog clutch 300 shifts from the disengaged configuration to the engaged configuration. The number and/or sizing of first splines 322 of sliding clutch 320 may correspond to or match the number and/or sizing of splines 312 of mating clutch 310. Thus, first splines 322 of sliding clutch 320 may mesh with splines 312 of mating clutch 310, as discussed in greater detail below. First splines 322 of sliding clutch 320 may also be uniformly distributed or spaced apart from one another on inner surface 324 of sliding clutch 320.

Second splines 326 of sliding clutch 320 may be positioned on or at an outer surface 328 of sliding clutch 320.

Thus, first and second splines 322, 326 of sliding clutch 320 may be positioned opposite each other on sliding clutch 320. Second splines 326 of sliding clutch 320 may be milled, shaped, extruded or otherwise suitably formed on outer surface 328 of sliding clutch 320. Second splines 326 of sliding clutch 320 may also extend helically along the outer surface 328 of sliding clutch 320 and also radially outward from outer surface 328 of sliding clutch 320, as shown in FIG. 4. Second splines 326 of sliding clutch 320 may correspond to a sun gear of automatic transmission 10. The helical shape of second splines 326 of sliding clutch 320 may allow sliding clutch 300 to rotate in same direction as mating clutch 310 upon engagement. Thus, first and second splines 322, 326 of sliding clutch 320 may be wound in the same direction. Second splines 326 of sliding clutch 320 may also be uniformly distributed or spaced apart from one another on outer surface 328 of sliding clutch 320.

Sliding clutch 320 is movable, e.g., axially along the axis of rotation R, in order to adjust dog clutch 300 between the engaged configuration and the disengaged configuration. In the engaged configuration, sliding clutch 320 is positioned relative to mating clutch 310 such that first splines 322 of sliding clutch 320 mesh with splines 312 of mating clutch 310. Conversely, sliding clutch 320 is positioned relative to mating clutch 310 such that first splines 322 of sliding clutch 320 do not mesh with splines 312 of mating clutch 310 in the disengaged configuration.

Dog clutch 300 also includes a synchronizer 330 that is configured for assisting with shifting dog clutch 300 from the disengaged configuration to the engaged configuration, as discussed in greater detail below. Synchronizer 330 is positioned at or within sliding clutch 320. In particular, inner surface 324 of sliding clutch 320 defines an interior chamber 325, and synchronizer 330 may be positioned within interior chamber 325 of sliding clutch 320. Synchronizer 330 includes a (e.g., annular) base 332 and a plurality of teeth 334 that extend (e.g., radially and/or helically) from base 332. Each tooth of teeth 334 is positioned between a, e.g., respective, pair of first splines 322 of sliding clutch 320 within interior chamber 325 of sliding clutch 320.

A biasing mechanism 338 is coupled to sliding clutch 320 and synchronizer 330. In particular, biasing mechanism 338 may extend between a bracket or washer 339 fixed to sliding clutch 320 within interior chamber 325 of sliding clutch 320 and base 332 of synchronizer 330. Biasing mechanism 338 is configured for urging synchronizer 330 towards mating clutch 310. In particular, mating clutch 310 may define a frustoconical or beveled surface 318, and base 332 of synchronizer 330 may define a frustoconical or beveled surface 336 that is complementary to beveled surface 318 of mating clutch 310. Beveled surface 318 of mating clutch 310 and beveled surface 336 of synchronizer 330 may be positioned adjacent and face each other, and biasing mechanism 338 may urge beveled surface 336 of synchronizer 330 against beveled surface 318 of mating clutch 310 while dog clutch 300 shifts from the disengaged configuration to the engaged configuration, as discussed in greater detail below.

As may be seen in FIG. 5, sliding clutch 320 extends between a first end portion 340 and a second end portion 342, e.g., along the axis of rotation R. First end portion 340 of sliding clutch 320 is positioned adjacent mating clutch 310 and is open in order to receive mating clutch 310 within interior chamber 325 of sliding clutch 320. Sliding clutch 320 defines a lip 329 at first end portion 340 of sliding clutch 320 within interior chamber 325 of sliding clutch 320. Synchronizer 330 (e.g., base 322 or teeth 334 of synchronizer 330) defines a width WS, and lip 329 of sliding clutch 320 also defines a width WL. The width WL of lip 329 is less than the width WS of synchronizer 330, e.g., such that biasing mechanism 338 urges synchronizer 330 (e.g., base 322 or teeth 334 of synchronizer 330) against lip 329 of sliding clutch 320 in the disengaged configuration. In such a manner, biasing member 338 may position synchronizer 330 at or adjacent first end portion 340 of sliding clutch 320 when dog clutch 300 is in the disengaged configuration. In addition, lip 329 of sliding clutch 320 may also hinder or prevent biasing member 338 from pushing synchronizer 330 out of interior chamber 325 of sliding clutch 320.

Biasing mechanism 338 may apply an adequate, constant pressure onto synchronizer 330 when synchronizer 330 contacts mating clutch 310. Also, biasing mechanism 338 allows synchronizer 330 to displace into interior chamber 325 of sliding clutch 320 when dog clutch 300 is in the engaged configuration and return to first end portion 340 of sliding clutch 320 in the disengaged configuration. Biasing mechanism 338 may be any suitable mechanism for urging synchronizer 330 towards mating clutch 310. For example, biasing mechanism 338 may be at least one mechanical spring, gas spring, etc.

As may be seen in FIGS. 4 and 5, each spline of first splines 322 of sliding clutch 320 and each spline of splines 312 of mating clutch 310 define an angled or pointed tip 344. Pointed tips 344 of first splines 322 of sliding clutch 320 and splines 312 of mating clutch 310 assist with shifting dog clutch 300 from the disengaged configuration to the engaged configuration. For example, pointed tips 344 of first splines 322 of sliding clutch 320 and pointed tips 344 of splines 312 of mating clutch 310 may engaged each other in order to guide meshing of first splines 322 of sliding clutch 320 with splines 312 of mating clutch 310 when dog clutch 300 shifts from the disengaged configuration to the engaged configuration. In particular, pointed tips 344 of first splines 322 of sliding clutch 320 may slide against splines 312 of mating clutch 310 in order to guide each spline of first splines 322 of sliding clutch 320 between a respective pair of splines of splines 312 of mating clutch 310 when dog clutch 300 shifts from the disengaged configuration to the engaged configuration. Pointed tips 344 of first splines 322 of sliding clutch 320 and splines 312 of mating clutch 310 may be angled such that opposing surfaces of pointed tips 344 define an acute angle therebetween.

FIGS. 6, 7 and 8 provide section views of dog clutch 300 with dog clutch 300 shown various positions. In FIG. 6, dog clutch 300 is shown in the disengaged configuration. In FIG. 8, dog clutch 300 is shown in the engaged configuration. In FIG. 7, dog clutch 300 is shown in a synchronization configuration between the engaged configuration of FIG. 6 and the disengaged configuration of FIG. 8. As discussed above, dog clutch 300 includes features for assisting with shifting dog clutch 300 from the disengaged configuration to the engaged configuration. Such features are discussed in greater detail below with reference to FIGS. 6, 7 and 8.

From the disengaged configuration shown in FIG. 6, sliding clutch 320 may be moved towards mating clutch 310, e.g., along the axis of rotation R. In particular, sliding clutch 320 may be moved towards mating clutch 310 along the axis of rotation R until beveled surface 336 of synchronizer 330 contacts beveled surface 318 of mating clutch 310 as shown in FIG. 7. Friction between synchronizer 330 and mating clutch 310 at beveled surface 336 of synchronizer 330 and beveled surface 318 of mating clutch 310 may reduce a rotational velocity difference between mating clutch 310 and sliding clutch 320 such that mating clutch 310 and sliding clutch 320 synchronize at the position shown in FIG. 7. By reducing the rotational velocity difference between mating clutch 310 and sliding clutch 320, teeth chatter and other potential damage to mating clutch 310 and/or sliding clutch 320 may be reduced.

With dog clutch 300 suitably synchronized, sliding clutch 320 may be further moved towards mating clutch 310, e.g., along the axis of rotation R, as shown in FIG. 8. In particular, sliding clutch 320 may be moved towards mating clutch 310 along the axis of rotation R until first splines 322 of sliding clutch 320 mesh with splines 312 of mating clutch 310, e.g., and each spline of first splines 322 of sliding clutch 320 is positioned between a respective pair of splines of splines 312 of mating clutch 310.

Helically shaped splines may assist with smoothly shifting dog clutch 300 from the disengaged configuration shown in FIG. 6 to the engaged configuration shown in FIG. 8. Further, helically shaped splines may assist with more complete engagement between first splines 322 of sliding clutch 320 with splines 312 of mating clutch 310 relative to linear or straight splines. Helically shaped splines may provide a circumferential force that aids engagement of the sliding clutch 320 with the mating clutch 310. Pointed spline tips may also reduce tooth butt damage and teeth chatter during shifting of dog clutch 300 from the disengaged configuration to the engaged configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An automatic transmission, comprising:
   a plurality of planetary gear sets;
   a plurality of shifting elements including a dog clutch, the dog clutch comprising
      a mating clutch mounted to a gear of the plurality of planetary gear sets, the mating clutch defining a plurality of helical splines at an outer surface of the mating clutch;
      a sliding clutch defining a plurality of helical splines at an inner surface of the sliding clutch, the sliding clutch movable between an engaged configuration and a disengaged configuration, the helical splines of the plurality of helical splines of the sliding clutch meshed with the helical splines of the plurality of helical splines of the mating clutch in the engaged configuration, the helical splines of the plurality of helical splines of the sliding clutch not meshed with the helical splines of the plurality of helical splines of the mating clutch in the disengaged configuration; and
      a synchronizer positioned at the sliding clutch, the synchronizer comprising a base and a plurality of teeth extending from the base, each tooth of the plurality of teeth positioned between a pair of helical splines of the plurality of helical splines of the sliding clutch.

2. The automatic transmission of claim 1, wherein the mating clutch and the synchronizer each defines a respective beveled surface, the beveled surface of the mating clutch and the beveled surface of the synchronizer positioned adjacent and facing each other.

3. The automatic transmission of claim 1, further comprising a biasing mechanism mounted to the sliding clutch and coupled to the base of the synchronizer, the biasing mechanism configured for urging the synchronizer towards the mating clutch.

4. The automatic transmission of claim 3, wherein biasing mechanism comprises a spring.

5. The automatic transmission of claim 1, wherein the inner surface of the sliding clutch defines an interior chamber, the synchronizer positioned within the interior chamber of the sliding clutch.

6. The automatic transmission of claim 5, wherein the sliding clutch extends between a first end portion and a second end portion, the first end portion of the sliding clutch positioned adjacent the mating clutch, the sliding clutch defining a lip at the first end portion of the sliding clutch, the synchronizer and the lip of the sliding clutch each defining a respective width, the width of the lip being less than the width of the synchronizer such that the biasing mechanism urges the synchronizer against the lip of the sliding clutch in the disengaged configuration.

7. The automatic transmission of claim 1, wherein each spline of the helical splines of the plurality of helical splines of the sliding clutch and each spline of the helical splines of the plurality of helical splines of the mating clutch defines a pointed tip.

8. The automatic transmission of claim 1, wherein the helical splines of the plurality of helical splines of the sliding clutch and the helical splines of the plurality of helical splines of the mating clutch each comprise at least ten helical splines.

9. The automatic transmission of claim 1, wherein the sliding clutch and the mating clutch rotate at a common speed in the engaged configuration.

10. A dog clutch for an automatic transmission, comprising:
    a mating clutch defining a plurality of helical splines at an outer surface of the mating clutch; and
    a sliding clutch defining a first plurality of helical splines at an inner surface of the sliding clutch and a second plurality of helical splines at an outer surface of the sliding clutch, the sliding clutch movable between an engaged configuration and a disengaged configuration, the helical splines of the first plurality of helical splines of the sliding clutch meshed with the helical splines of the plurality of helical splines of the mating clutch in the engaged configuration, the helical splines of the first plurality of helical splines of the sliding clutch not meshed with the helical splines of the plurality of helical splines of the mating clutch in the disengaged configuration; and
    a synchronizer positioned at the sliding clutch, the synchronizer comprising a base and a plurality of teeth extending from the base, each tooth of the plurality of teeth positioned between a pair of helical splines of the first plurality of helical splines of the sliding clutch.

11. The dog clutch of claim 10, wherein the mating clutch and the synchronizer each defines a respective beveled surface, the beveled surface of the mating clutch and the beveled surface of the synchronizer positioned adjacent and facing each other.

12. The dog clutch of claim 11, further comprising a biasing mechanism mounted to the sliding clutch and coupled to the base of the synchronizer, the biasing mechanism configured for urging the synchronizer towards the mating clutch.

13. The dog clutch of claim 12, wherein biasing mechanism comprises a spring.

14. The dog clutch of claim 10, wherein the inner surface of the sliding clutch defines an interior chamber, the synchronizer positioned within the interior chamber of the sliding clutch.

15. The dog clutch of claim 14, the sliding clutch extends between a first end portion and a second end portion, the first end portion of the sliding clutch positioned adjacent the mating clutch, the sliding clutch defining a lip at the first end portion of the sliding clutch, the synchronizer and the lip of the sliding clutch each defining a respective width, the width of the lip being less than the width of the synchronizer such that the biasing mechanism urges the synchronizer against the lip of the sliding clutch in the disengaged configuration.

16. The dog clutch of claim 10, wherein each spline of the helical splines of the first plurality of helical splines of the sliding clutch and each spline of the helical splines of the plurality of helical splines of the mating clutch defines a pointed tip.

17. The dog clutch of claim 10, wherein the helical splines of the first plurality of splines of the sliding clutch and the helical splines of the plurality of helical splines of the mating clutch each comprise at least ten helical splines.

18. The dog clutch of claim 10, wherein the sliding clutch and the mating clutch rotate at a common speed in the engaged configuration.

* * * * *